US012593202B2

(12) United States Patent
Dar et al.

(10) Patent No.: US 12,593,202 B2
(45) Date of Patent: Mar. 31, 2026

(54) UPDATING CONTACT INFORMATION USING SMS AFTER A NUMBER CHANGE

(71) Applicant: T-Mobile USA, Inc., Bellevue, WA (US)

(72) Inventors: Sheraz Farooq Dar, Bellevue, WA (US); Sudhanshu Pandey, Bellevue, WA (US); Zakir Hussain Syed, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 358 days.

(21) Appl. No.: 18/484,240

(22) Filed: Oct. 10, 2023

(65) Prior Publication Data

US 2025/0119728 A1    Apr. 10, 2025

(51) Int. Cl.
*H04W 8/26* (2009.01)
*H04W 4/14* (2009.01)
*H04W 8/18* (2009.01)

(52) U.S. Cl.
CPC ............... *H04W 8/26* (2013.01); *H04W 4/14* (2013.01); *H04W 8/18* (2013.01)

(58) Field of Classification Search
CPC ............ H04W 8/18; H04W 8/26; H04W 4/14
See application file for complete search history.

(56) References Cited

U.S. PATENT DOCUMENTS

| | | | |
|---|---|---|---|
| 5,878,397 A | 3/1999 | Stille et al. | |
| 5,884,170 A | 3/1999 | Valentine et al. | |

| | | | |
|---|---|---|---|
| 5,915,222 A | 6/1999 | Olsson et al. | |
| 5,946,630 A | 8/1999 | Willars et al. | |
| 6,052,591 A | 4/2000 | Bhatia | |
| 6,223,045 B1 | 4/2001 | Valentine et al. | |
| 6,263,212 B1 | 7/2001 | Ross et al. | |
| 6,327,479 B1 | 12/2001 | Mikkola | |
| 6,633,764 B1 | 10/2003 | Garcia | |
| 6,690,931 B2 | 2/2004 | Heo | |
| 6,819,932 B2 | 11/2004 | Allison et al. | |
| 6,920,332 B2 | 7/2005 | Ala-luukko | |
| 7,065,199 B1 | 6/2006 | Hyllander et al. | |

(Continued)

FOREIGN PATENT DOCUMENTS

| | | | |
|---|---|---|---|
| CN | 101754141 A | 6/2010 | |
| CN | 101867897 A | 10/2010 | |

(Continued)

*Primary Examiner* — Wayne H Cai
(74) *Attorney, Agent, or Firm* — Perkins Coie LLP

(57) ABSTRACT

The disclosed technology performs an automatic update of a Mobile Station International Subscriber Directory Number (MSISDN) change to at least a subset of contacts associated with a user account. Upon receiving an indication of a MSISDN change associated with an account, a contact update server of a telecommunications network retrieves contact information that includes multiple contacts of the account with multiple identifiers. The contact update server generates short messaging service (SMS) messages to be delivered to the multiple contacts of the account based on the multiple identifiers. The SMS messages include information regarding the MSISDN change associated with the account. The contact update server transfers the SMS messages to a short message service center (SMSC), and the SMSC delivers the SMS messages to the multiple contacts of the account.

20 Claims, 4 Drawing Sheets

(56)　　　　References Cited

U.S. PATENT DOCUMENTS

| | | | |
|---|---|---|---|
| 7,069,030 | B2 | 6/2006 | Yoon |
| 7,113,781 | B1 | 9/2006 | Allison et al. |
| 7,155,243 | B2 | 12/2006 | Baldwin et al. |
| 7,260,412 | B2 | 8/2007 | Shaheen |
| 7,366,516 | B1 | 4/2008 | Oh et al. |
| 7,583,974 | B2 | 9/2009 | Benco et al. |
| 7,689,234 | B2 | 3/2010 | Horvath et al. |
| 7,711,378 | B2 | 5/2010 | Lehtikangas et al. |
| 7,774,005 | B2 | 8/2010 | Joo |
| 7,774,008 | B2 | 8/2010 | Benaouda et al. |
| 8,010,164 | B1 | 8/2011 | Sennett et al. |
| 8,086,254 | B2 | 12/2011 | Silver et al. |
| 8,150,428 | B2 | 4/2012 | Kupsh et al. |
| 8,200,258 | B2 | 6/2012 | Yahav et al. |
| 8,331,962 | B2 | 12/2012 | Chang |
| 8,331,963 | B1 | 12/2012 | Lin et al. |
| 8,364,180 | B2 | 1/2013 | Harris et al. |
| 8,755,361 | B2 | 6/2014 | Li |
| 8,761,817 | B2 | 6/2014 | Chen et al. |
| 8,918,125 | B2 | 12/2014 | Zhou et al. |
| 9,179,273 | B2 | 11/2015 | Jeong et al. |
| 9,392,425 | B2 | 7/2016 | Hong et al. |
| 9,445,246 | B2 | 9/2016 | Stojanovski |
| 9,467,823 | B2 | 10/2016 | Hou et al. |
| 9,497,605 | B2 | 11/2016 | Duan |
| 9,635,526 | B2 | 4/2017 | Mccann |
| 9,838,856 | B1 | 12/2017 | Youtz et al. |
| 10,117,072 | B1 | 10/2018 | Lee et al. |
| 10,142,827 | B2 | 11/2018 | Jeong et al. |
| 10,499,206 | B1 | 12/2019 | Dar et al. |
| 10,771,979 | B2 | 9/2020 | Bai et al. |
| 10,932,097 | B2 | 2/2021 | Hua et al. |
| 11,700,510 | B2 | 7/2023 | Chaurasia et al. |
| 2002/0028686 | A1 | 3/2002 | Kagi |
| 2003/0016639 | A1 | 1/2003 | Kransmo et al. |
| 2004/0053629 | A1 | 3/2004 | Rueger et al. |
| 2004/0198329 | A1 | 10/2004 | Vasa |
| 2008/0102866 | A1 | 5/2008 | Fiorillo et al. |
| 2008/0176588 | A1 | 7/2008 | Ashdown et al. |
| 2011/0105117 | A1 | 5/2011 | Chin et al. |
| 2011/0287764 | A1 | 11/2011 | Zitnik |
| 2012/0100835 | A1 | 4/2012 | Li |
| 2012/0208573 | A1* | 8/2012 | Tamchina ............ H04M 1/2757 |
| | | | 455/466 |
| 2013/0303107 | A1 | 11/2013 | Mitchell et al. |
| 2017/0013427 | A1 | 1/2017 | Alavala et al. |
| 2017/0289306 | A1* | 10/2017 | Tan ......................... H04L 67/60 |
| 2018/0213078 | A1 | 7/2018 | Visuri et al. |
| 2022/0360954 | A1 | 11/2022 | Castellanos Zamora et al. |
| 2023/0117620 | A1 | 4/2023 | Schumacher |
| 2023/0319181 | A1 | 10/2023 | Dizengof et al. |

FOREIGN PATENT DOCUMENTS

| | | |
|---|---|---|
| CN | 106658447 A | 5/2017 |
| DE | 102006040499 A1 | 3/2008 |
| EP | 1377086 B1 | 10/2006 |
| EP | 1933573 A1 | 6/2008 |
| EP | 1763261 B1 | 8/2008 |
| KR | 100241360 B1 | 2/2000 |
| KR | 100275479 B1 | 12/2000 |
| KR | 100296119 B1 | 8/2001 |
| KR | 20020072921 A | 9/2002 |
| KR | 20030062622 A | 7/2003 |
| KR | 100428264 B1 | 4/2004 |
| KR | 20040072066 A | 8/2004 |
| KR | 20040091416 A | 10/2004 |
| KR | 100466852 B1 | 1/2005 |
| KR | 20050079355 A | 8/2005 |
| KR | 100520999 B1 | 10/2005 |
| KR | 100521004 B1 | 10/2005 |
| KR | 100542378 B1 | 1/2006 |
| KR | 20060028028 A | 3/2006 |
| KR | 20060066763 A | 6/2006 |
| KR | 20070019871 A | 2/2007 |
| KR | 100693717 B1 | 3/2007 |
| KR | 100706492 B1 | 4/2007 |
| KR | 100727762 B1 | 6/2007 |
| KR | 101106442 B1 | 1/2012 |
| KR | 101127364 B1 | 3/2012 |
| KR | 101173217 B1 | 8/2012 |
| WO | 02082835 A1 | 10/2002 |
| WO | 2004016013 A2 | 2/2004 |
| WO | 2004114544 A1 | 12/2004 |
| WO | 2011057548 A1 | 5/2011 |
| WO | 2011144113 A2 | 11/2011 |
| WO | 2012055134 A1 | 5/2012 |
| WO | 2012079233 A1 | 6/2012 |
| WO | 2012164551 A2 | 12/2012 |
| WO | 2013105976 A1 | 7/2013 |
| WO | 2013133564 A1 | 9/2013 |
| WO | 2014191985 A1 | 12/2014 |

* cited by examiner

400

Processor 402

Instructions
404

Main Memory 406

Instructions
408

Non-Volatile Memory 410

Network Interface Device 412

Network
414

Bus
416

Display Device 418

Input/Output Device 420

Control Device 422

Drive Unit 424

Machine-Readable (Storage)
Medium 426

Instructions
428

Signal Generation Device 430

UPDATING CONTACT INFORMATION USING SMS AFTER A NUMBER CHANGE

BACKGROUND

Mobile Station International Subscriber Directory Number (MSISDN) is a number uniquely identifying a subscription in a Global System for Mobile communications or a Universal Mobile Telecommunications System mobile network. MSISDN is the mapping of the telephone number to the subscriber identity module in a mobile or cellular phone.

MSISDN and international mobile subscriber identity (IMSI) are two important numbers used for identifying a mobile subscriber. IMSI is stored in a subscriber identity module (SIM) which is inserted into a mobile phone and uniquely identifies the associated mobile station, home wireless network, and home country of the home wireless network. MSISDN is used for routing calls to the mobile subscriber, whereas IMSI is often used as a key in a home location register. MSISDN is the number normally dialed to connect a call to the mobile phone of the mobile subscriber. A SIM has a unique IMSI that does not change, while the MSISDN can change in time.

BRIEF DESCRIPTION OF THE DRAWINGS

Detailed descriptions of implementations of the present invention will be described and explained through the use of the accompanying drawings.

Figure 1:
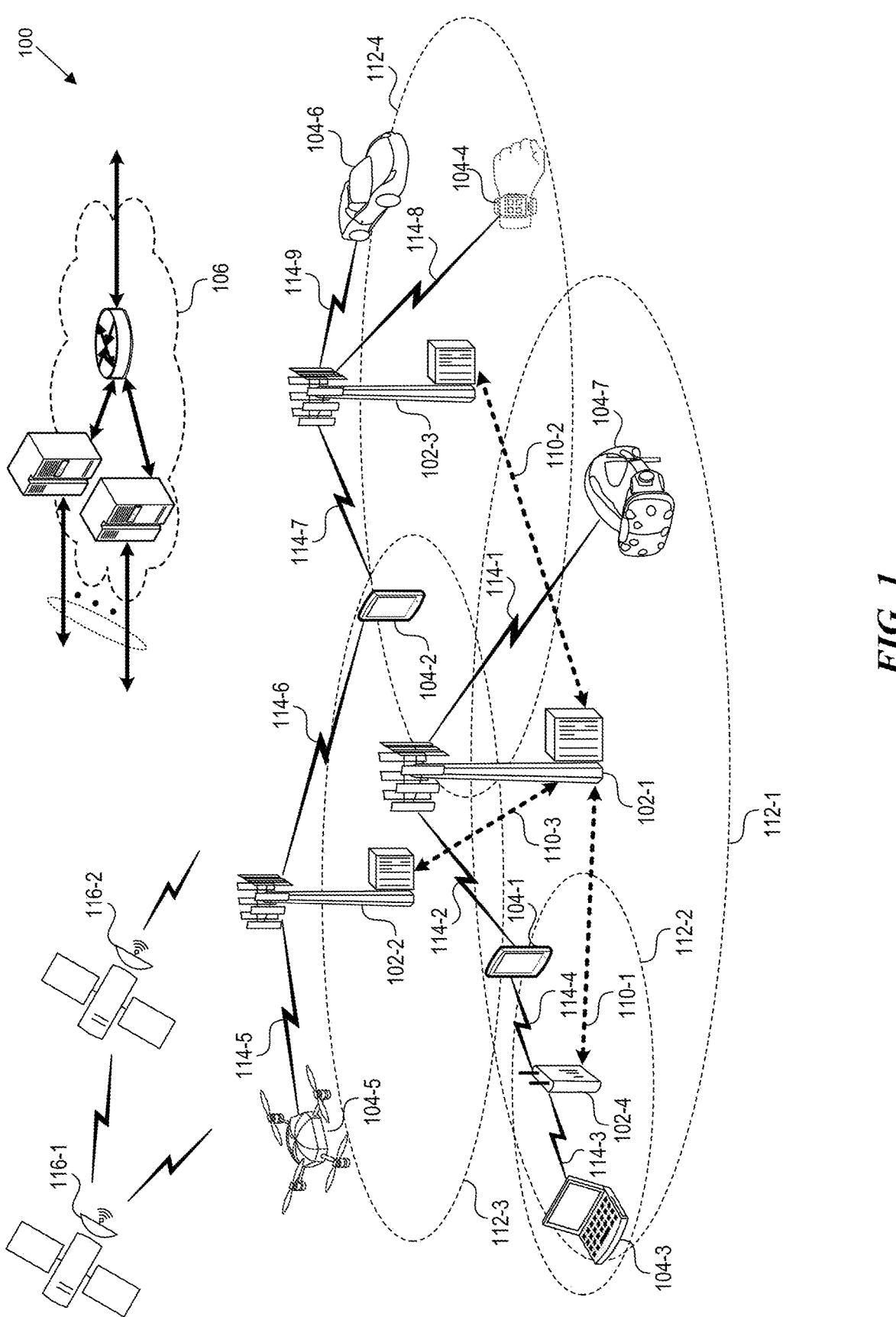
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technologies relate to automatically updating a Mobile Station International Subscriber Directory Number (MSISDN) change in a telecommunications network. Various implementations generally relate to systems and methods for providing a network capability such that contacts that are marked as trusted contacts may receive network messages updating the phone number change.

Currently, when a user changes the MSISDN in a telecommunications network, there is no simple and automatic way to inform the people in the contact list about the MSISDN change. The only option available to the user is to inform each contact whom the user wishes to share the MSISDN change with.

Implementations described herein addresses such shortcomings by utilizing a contact update server of the telecommunications network to perform an automatic update of the MSISDN change to trusted contacts using the contact information saved by the user. When the user changes their MSISDN, a unified data management (UDM) of the mobile device updates the number change to the contact update server. The contact update server retrieves the contact information from the virtual storage space and generates short messaging service (SMS) messages to at least some of the contacts based on the contact information. The contact update server transfers the SMS messages to a short message service center (SMSC) of the telecommunications network, and the SMSC delivers the SMS messages to the trusted contacts of the user.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Automatically Updating MSISDN Changes in a Telecommunications Network

Figure 2:
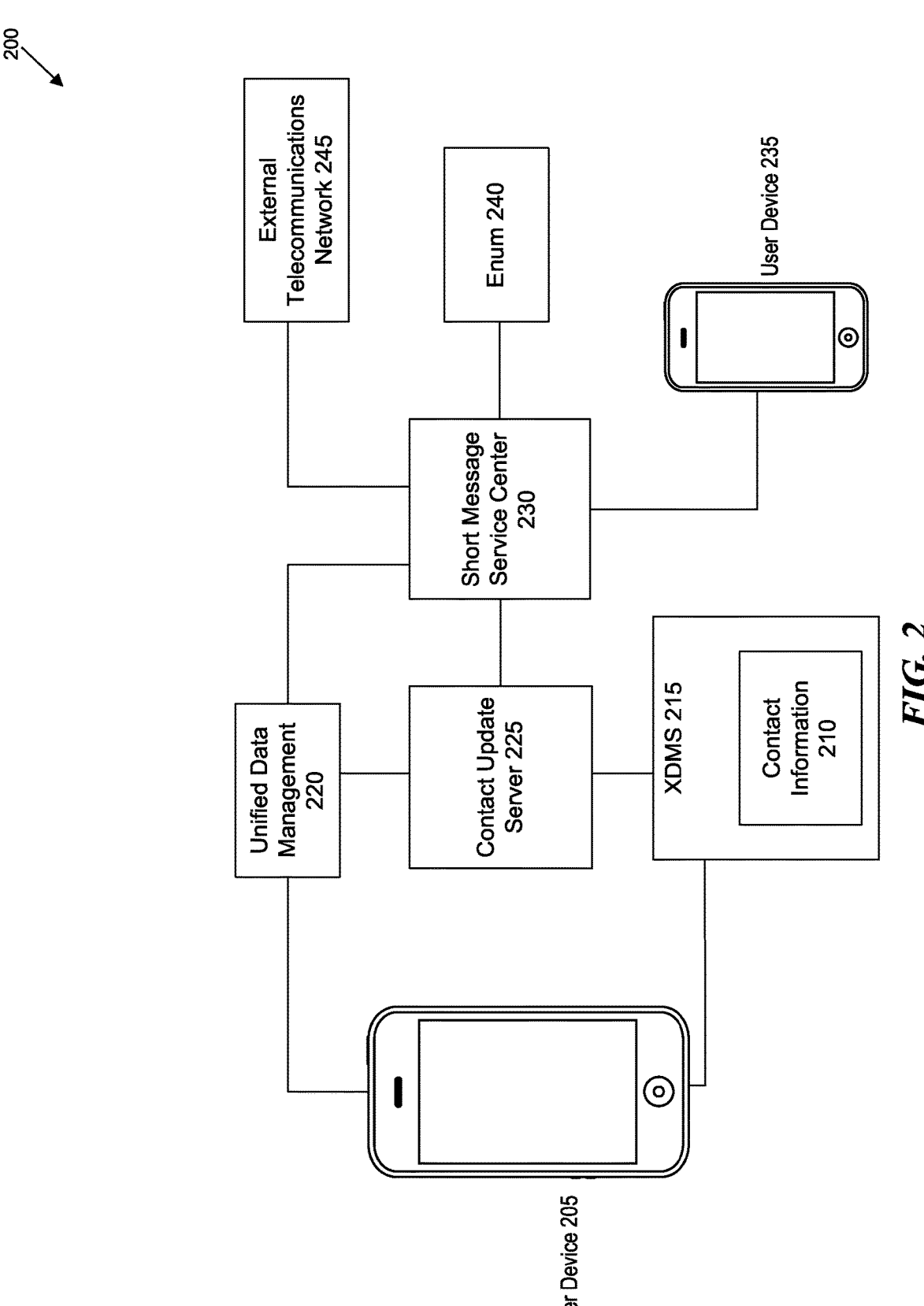
FIG. 2 is a block diagram that illustrates an environment in which MSISDN changes are automatically updated, according to some implementations.

FIG. 2 is a block diagram that illustrates an environment 200 in which MSISDN changes are automatically updated, according to some implementations. As illustrated in FIG. 2, the environment 200 includes an extensible markup language (XML) document management server (XDMS) 215, a unified data management (UDM) 220, a contact update server 225, a short message service center (SMSC) 230, E.164 number mapping (ENUM) 240, an external telecommunications network 245, and user devices 205 and 235 of the telecommunications network. Other implementations include additional, fewer, or different entities within the telecommunications network that communicate with each other to automatically update the MSISDN change.

Contacts are other MSISDNs associated with other user accounts. The other user accounts may include customers within the telecommunications network as well as customers of other telecommunications networks. When a user creates an entry for a contact via the user device 205, the user device 205 uploads the contact information 210 to the XDMS 215. The user's contact information 210 can be stored as an XML file in the XMDS 215.

In some implementations, when a user of a user device 205 creates a contact on a mobile device, the user is able to fill out an additional field indicating whether the newly created contact is a trusted contact. A trusted contact may be the MSISDN for an individual with whom the user is willing to share the MSISDN change. An untrusted contact may be MSISDN for an individual with whom the user would not like to share the MSISDN change. For a contact indicated by the user to be a trusted contact, the contact information 210 can thus include an identifier (e.g., a flag or an entry in an XML data field) marking the contact as trusted. In some implementations, each contact in the contact information 210 contains an identifier to mark the contact of the user as trusted or not trusted. The contact information 210 can also include other identifiers that provide information about each contact. The identifiers may be predefined by the user or the telecommunications network.

As shown in FIG. 2, when the user of the user device 205 changes the MSISDN associated with a user account, the UDM 220 can communicate to the contact update server 225 of the MSISDN change. Upon receiving information regarding the MSISDN change associated with the user account, the contact update server 225 can retrieve the contact information 210 associated with the user account from the XDMS 215. In some implementations, the contact information 210 is retrieved from a virtual storage space of the telecommunications network.

The contact information 210 may contain contacts associated with the user account. In some implementations, the contact information 210 includes one or more identifiers that provide information about each contact, such as whether a contact is a trusted contact or not. Using the information contained in the contact information 210, the contact update server 225 can generate SMS messages to be sent to the contacts based on the one or more identifiers. For example, the contact update server 225 may generate SMS messages to be sent to contacts identified as trusted contacts, wherein the SMS messages include information regarding the MSISDN change associated with the user account. In some implementations, the SMS messages include a link to automatically update the MSISDN of the user. When the link is accessed on a contact's mobile device, the mobile device executes instructions that cause the mobile device to replace a previous MSISDN of the user (e.g., in a contacts list stored on the mobile device) with the new MSISDN.

The contact update server 225 can transfer the SMS messages to the SMSC 230 of the telecommunications network. In some implementations, the SMSC 230 checks the ENUM 240 of the contacts to whom the SMSC 230 is to deliver the SMS messages. The SMSC 230 can check the ENUM 240 to determine whether a contact is a customer of the telecommunications network. If a contact is a customer of an external telecommunications network 245, e.g. an offnet international telecommunications network such as Syniverse, the SMSC 230 delivers the SMS message to the corresponding external telecommunications network. If a contact is a customer of the telecommunications network, such as user device 235, the SMSC 230 delivers the SMS message to the contact if the contact satisfies conditions for receiving the SMS message regarding the MSISDN change. The user device 235 may receive, through an SMS message, information regarding the MSISDN change. In some implementations, the user device 235 may receive a link that automatically updates the MSISDN of the user who initiated the MSISDN change.

Figure 3:
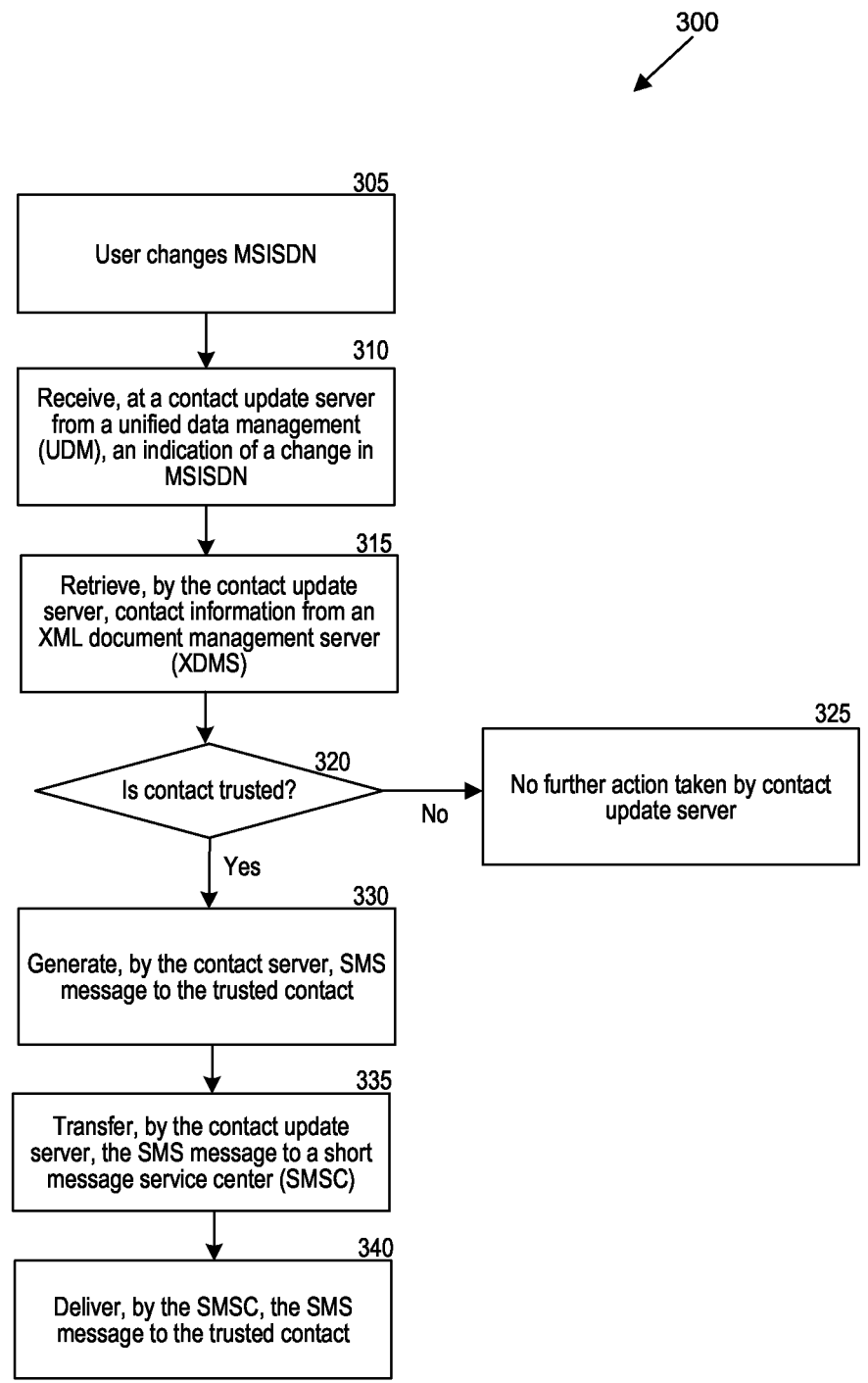
FIG. 3 is a flowchart illustrating a process for performing an automatic update of the MSISDN change to trusted contacts of a user associated with the MSISDN change, according to some implementations.

FIG. 3 is a flowchart illustrating a process for performing an automatic update of the MSISDN change to trusted contacts of a user associated with the MSISDN change, according to some implementations. The process 300 can be performed by the contact update server 225, in some implementations. Other implementations of the process 300 include additional, fewer, or different steps or performing the steps in different orders.

In step 305, a user of a telecommunications network changes the MSISDN associated with a user account. In step 310, the contact update server may receive, from a UDM of the telecommunications network, an indication of the MSISDN change. The UDM manages and stores network user data in a single, centralized element. In some implementations, the UDM is a stateful UDM which keeps the network user data locally within the telecommunications network. In other implementations, the UDM is a stateless UDM wherein the network user data is stored externally in one or more unified data repositories (UDR), each offering a unified database for storing various types of the network user data, such as application, subscription, authentication, service authorization, and policy data.

In step 315, in response to receiving the indication of the MSISDN change associated with the user, the contact update server can retrieve contact information of the user from the XDMS. The contact information includes one or more contacts associated with the user account. In some implementations, when the user creates a new contact using a user device, the user is prompted to indicate whether the new contact is a trusted contact. In other implementations, the user is able to flag the new contact using one or more identifiers to distinguish the new contact from existing contacts. For example, the one or more identifiers allow the user to flag a new contact as a coworker, a family member, or unknown contact. The contact information may be saved as an XML file. In some implementations, the contact information is periodically updated. In other implementations, in order to conserve resources, the contact information is updated only in response to the user creating a new contact or making changes to the one or more contacts associated with the user account.

In step 320, the contact update server can determine whether a contact is a trusted contact. As shown in step 325, the contact update server may take no further action for contacts that are identified as not trusted. As shown in step 330, upon determining that the contact is a trusted contact, the contact update server may generate an SMS message to be sent to the trusted contact. The SMS message may be a text message indicating the MSISDN change associated with the user. Alternatively and/or additionally, the SMS message may include a yes or no button indicating whether a recipient of the SMS message grants permission to accept the MSISDN change associated with the user. In some implementations, the SMS message includes a link to automatically update the MSISDN of the user.

In some implementations, instead of determining whether a contact is a trusted contact, the contact update server may determine whether a particular identifier is present in the contact information of the contact. For example, the contact update server may determine whether a contact is flagged as a coworker or a family member and generate an SMS message accordingly. Alternatively, some contacts may belong to a group of contacts (e.g., a group of coworker contacts or a group of family contacts), where the group includes an identifier indicating that the members of the group should receive updated MSISDNs. In this case, the contact update server can determine whether a contact belongs to a group that includes a particular identifier.

In step 335, the contact update server can transfer the SMS message to an SMSC of the telecommunications network. The SMSC handles text message operations in the telecommunications network and is responsible for receiving, storing, routing, and forwarding SMS messages from mobile devices of the telecommunications network.

In step 340, the SMSC may deliver the SMS message to the trusted contact. In some implementations, prior to delivering the SMS message to the trusted contact, the SMSC checks the ENUM of the trusted contact to determine whether the trusted contact is a local contact within the telecommunications network or an offnet contact of an external telecommunications network. Upon determining that the trusted contact is an offnet contact, the SMSC may deliver the SMS message to the SMSC of the external telecommunications network associated with the trusted contact. The user account may be identified as a sender of the SMS message. Alternatively, the SMS message may be sent as a network message from the telecommunications network with an unidentified sender.

In some implementations, the SMSC can determine whether a mobile device of the trusted contact is available to receive the SMS message. A mobile device may be unavailable to receive an SMS message if, for example, it is powered off, it is out of range of a telecommunications network, or if it has been removed from an account of the trusted contact. Upon determining that the mobile device of the trusted contact is not available to receive the SMS message, the SMSC may store the SMS message for a predetermined time. The SMSC may perform the determination periodically until the mobile device is determined to be available and deliver the message to the mobile device of the trusted contact accordingly.

Computer System

Figure 4:
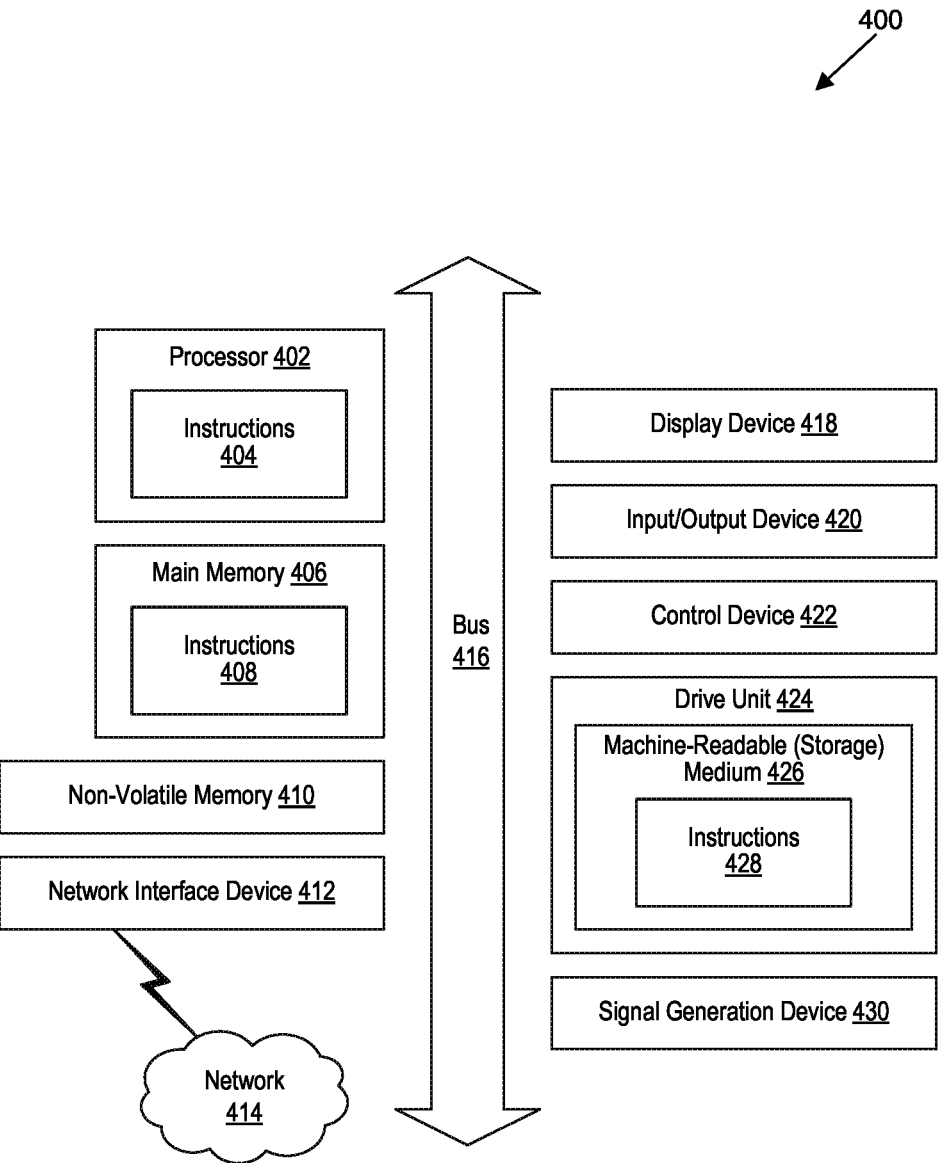
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation.

The applicant reserves the right to pursue such additional claim forms in either this application or in a continuing application.

The invention claimed is:

1. A method for transmitting Mobile Station International Subscriber Directory Number (MSISDN) changes associated with telecommunication accounts in a telecommunications network, the method comprising:

receiving at a contact update server of the telecommunications network, from a unified data management (UDM), an indication of a change in MSISDN for an account;

retrieving, by the contact update server, contact information associated with the account from an XML document management server (XDMS), wherein the contact information includes multiple contacts of the account, and wherein each contact is associated with an identifier;

generating, by the contact update server, a set of short messaging service (SMS) messages to each of the multiple contacts based on the associated identifiers, wherein the SMS messages include information related to the MSISDN change;

transferring, by the contact update server, the set of SMS messages to a short message service center (SMSC) of the telecommunications network; and delivering the SMS messages to each of the multiple contacts of the account by the SMSC.

2. The method of claim 1, wherein the SMS messages include a link to automatically update a MSISDN for a user associated with the account.

3. The method of claim 1, wherein the associated identifiers include a flag indicating a contact is a trusted contact, and wherein delivering the SMS messages to the multiple contacts of the account comprises delivering the SMS messages to a selected contact responsive to determining the selected contact is a trusted contact.

4. The method of claim 1, wherein delivering the SMS messages to each of the multiple contacts further comprises:

checking, by the SMSC, E.164 Number Mapping (ENUM) of each of the multiple contacts;

determining whether each of the multiple contacts is a local contact or an offnet contact; and delivering, by the SMSC, the SMS messages to local contacts of the multiple contacts.

5. The method of claim 4, wherein the SMS messages are delivered, by the SMSC, to an external telecommunications network for offnet contacts.

6. The method of claim 1, wherein delivering the SMS messages to each of the multiple contacts further comprises:

determining whether a contact of the multiple contacts is available to receive the SMS messages;

delivering, by the SMSC, the SMS messages to available contacts; and storing, by the SMSC, the SMS messages for a predetermined time for unavailable contacts.

7. The method of claim 1, wherein the SMS messages are system messages with an unidentified sender.

8. A non-transitory, computer-readable storage medium comprising instructions recorded thereon, wherein the instructions when executed by at least one processor of a system, cause the system to:

receive, at a contact update server of a telecommunications network, from a unified data management (UDM), an indication of a telephone number change associated with an account in the telecommunications network;

retrieve, by the contact update server, contact information associated with the account from a virtual storage space of the telecommunications network, wherein the contact information includes multiple contacts of the account, and wherein each contact is associated with an identifier;

generate, by the contact update server, a set of short messaging service (SMS) messages to each of the multiple contacts based on the associated identifiers, wherein the SMS messages include information related to the telephone number change;

transfer, by the contact update server, the set of SMS messages to a short message service center (SMSC) of the telecommunications network; and deliver the SMS messages to each of the multiple contacts of the account via the SMSC.

9. The non-transitory, computer-readable storage medium of claim 8, wherein the SMS messages include a link to automatically update a telephone number for a user associated with the account.

10. The non-transitory, computer-readable storage medium of claim 8, wherein the associated identifiers include a flag indicating a contact is a trusted contact, and wherein delivering the SMS messages to the multiple contacts of the account comprises delivering the SMS messages to a selected contact responsive to determining the selected contact is a trusted contact.

11. The non-transitory, computer-readable storage medium of claim 8, wherein delivering the SMS messages to each of the multiple contacts further comprises:

checking, by the SMSC, E.164 Number Mapping (ENUM) of each of the multiple contacts;

determining whether each of the multiple contacts is a local contact or an offnet contact; and delivering, by the SMSC, the SMS messages to local contacts of the multiple contacts.

12. The non-transitory, computer-readable storage medium of claim 11, wherein the SMS messages are delivered, by the SMSC, to an external telecommunications network for offnet contacts.

13. The non-transitory, computer-readable storage medium of claim 8, wherein delivering the SMS messages to each of the multiple contact further comprises:

determining whether a contact of the multiple contacts is available to receive the SMS messages;

delivering, by the SMSC, the SMS messages to available contacts; and storing, by the SMSC, the SMS messages for a predetermined time for unavailable contacts.

14. The non-transitory, computer-readable storage medium of claim 8, wherein the SMS messages are system messages with an unidentified sender.

15. A system comprising:

at least one hardware processor; and at least one non-transitory memory storing instructions, which, when executed by the at least one hardware processor, cause the system to:

receive, at a contact update server of a telecommunications network, from a unified data management (UDM), an indication of a telephone number change associated with an account in the telecommunications network;

retrieve, by the contact update server, contact information associated with the account from a virtual storage space of the telecommunications network, wherein the contact information includes multiple contacts of the account, and wherein each contact is associated with an identifier;

generate, by the contact update server, a set of short messaging service (SMS) messages to each of the multiple contacts based on the associated identifiers, wherein the SMS messages include information related to the telephone number change;

transfer, by the contact update server, the set of SMS messages to a short message service center (SMSC) of the telecommunications network; and deliver the SMS messages to each of the multiple contacts of the account via the SMSC.

16. The system of claim 15, wherein the SMS messages include a link to automatically update a telephone number for a user associated with the account.

17. The system of claim 15, wherein the associated identifiers include a flag indicating a contact is a trusted contact, and wherein delivering the SMS messages to the multiple contacts of the account comprises delivering the SMS messages to a selected contact responsive to determining the selected contact is a trusted contact.

18. The system of claim 15, wherein delivering the SMS messages to each of the multiple contacts further comprises:

checking, by the SMSC, E.164 Number Mapping (ENUM) of each of the multiple contacts;

determining whether each of the multiple contacts is a local contact or an offnet contact; and delivering, by the SMSC, the SMS messages to local contacts of the multiple contacts.

19. The system of claim 18, wherein the SMS messages are delivered, by the SMSC, to an external telecommunications network for offnet contacts.

20. The system of claim 15, wherein delivering the SMS messages to each of the multiple contact further comprises:

determining whether a contact of the multiple contacts is available to receive the SMS messages;

delivering, by the SMSC, the SMS messages to available contacts; and storing, by the SMSC, the SMS messages for a predetermined time for unavailable contacts.

* * * * *